July 24, 1951

P. H. WASHAM, JR 2,562,075

APPARATUS FOR DETERMINING THE AVERAGE
THICKNESS OF COILED STRIP

Filed Jan. 9, 1945

INVENTOR
PATRICK H. WASHAM, JR.,
by: John E. Jackson
his Attorney.

INVENTOR
PATRICK H. WASHAM, JR.,
by: John E. Jackson
his Attorney.

July 24, 1951   P. H. WASHAM, JR   2,562,075
APPARATUS FOR DETERMINING THE AVERAGE
THICKNESS OF COILED STRIP Filed Jan. 9, 1945   4 Sheets-Sheet 4

INVENTOR
PATRICK H. WASHAM, JR.,
by John E. Jackson
his Attorney.

Patented July 24, 1951

2,562,075

UNITED STATES PATENT OFFICE 2,562,075

APPARATUS FOR DETERMINING THE AVERAGE THICKNESS OF COILED STRIP

Patrick H. Washam, Jr., Girard, Ohio

Application January 9, 1945, Serial No. 572,070

7 Claims. (Cl. 33—125)

This invention relates to apparatus for determining the average gauge of coiled strip. This average gauge of coiled strip is determined by counting the number of wraps wound on the coil, and measuring the radial thickness on the coil of that number of wraps. The radial thickness thus measured divided by the number of wraps is the actual average thickness of the strip.

While apparatus is known for this purpose, it is limited in its operation to a predetermined portion of a coil.

The present invention provides an apparatus for the indicated purpose, which is simple in its mechanical construction and is more accurate and flexible than the various devices which have been advanced heretofore. By the use of the equipment of the present invention, the average gauge of strip in the entire coil may be determined, or the average gauge of strip in several different parts of the coil may be obtained.

The present invention makes use of two electrically operated counting devices, one of which registers the number of revolutions or wraps on the reel, while the other measures the radial build-up of the coil for any particular number of wraps and is started simultaneously with the revolution counter. The radial measurement is accurate to 0.005 inch, and may be taken at any part of the coil, or at more than one part of a coil.

The apparatus of the present invention will be understood more readily by a consideration of the accompanying drawings wherein:

Figure 1 is a plan view, partly in section, of a portion of a strip mill showing a finishing stand of rolls for the strip, and belt wrapping mechanism for starting the winding of the strip on a reel, the view showing the belt wrapping mechanism retracted away from the reel which carries the strip being coiled, the gauge measuring instrumentalities being shown in operative engagement with the strip being wound on the reel;

Figure 6 is a sectional elevation of that portion of the mechanism taken on the line VI—VI of Figure 4, looking in the direction of the arrows;

Figure 8 is a schematic wiring diagram showing wiring connections between the counter-actuating switches, and counting instrumentalities actuated thereby, which are mounted on the customary instrument panel for the illustrated strip mill.

Figure 1:
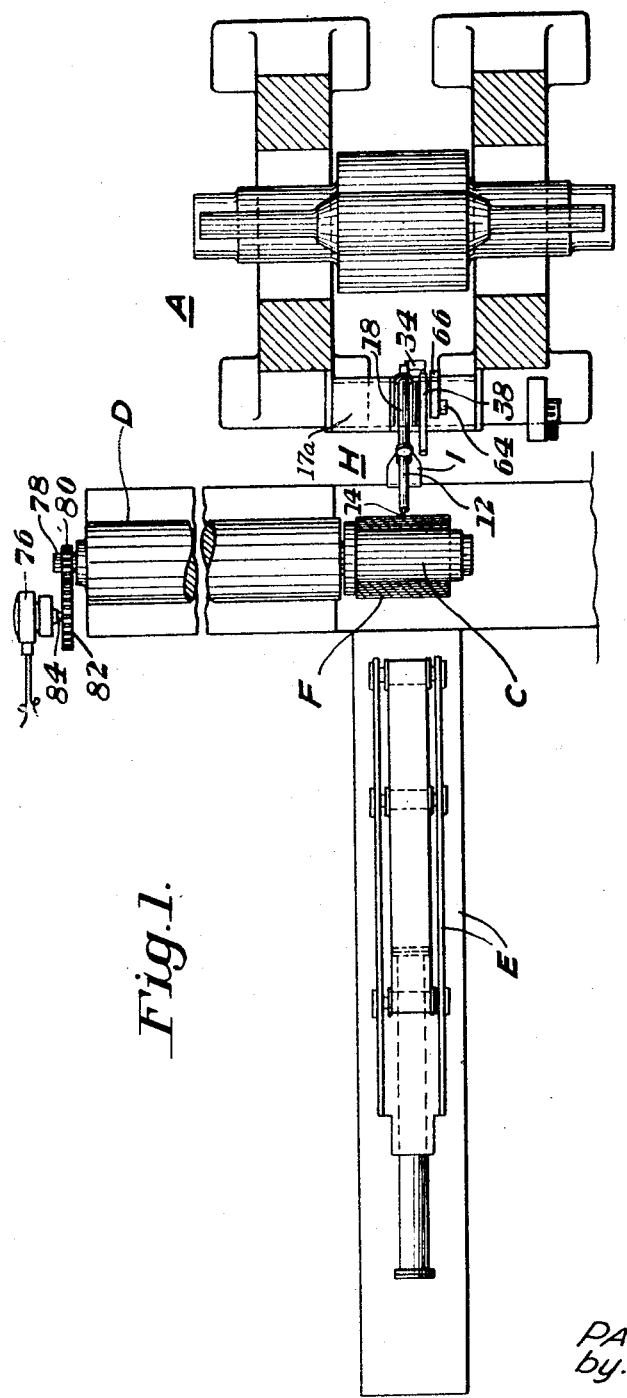
Figure 2:
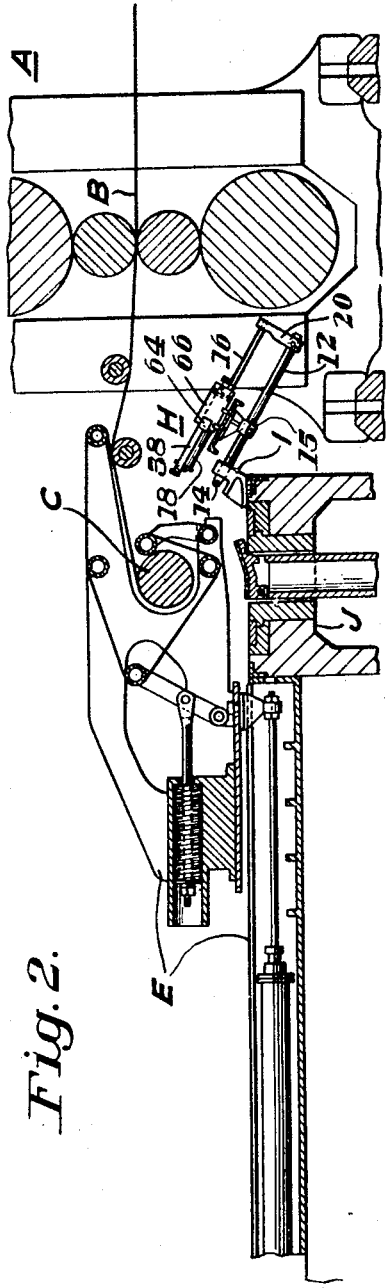
Figure 2 is a sectional elevation of the assembly of Figure 1, the view being taken along the longitudinal center line of the apparatus, but showing the belt-wrapping mechanism in advanced position for starting the winding of the strip on the reel, the gauge measuring device being shown in retracted position.
Figure 3:
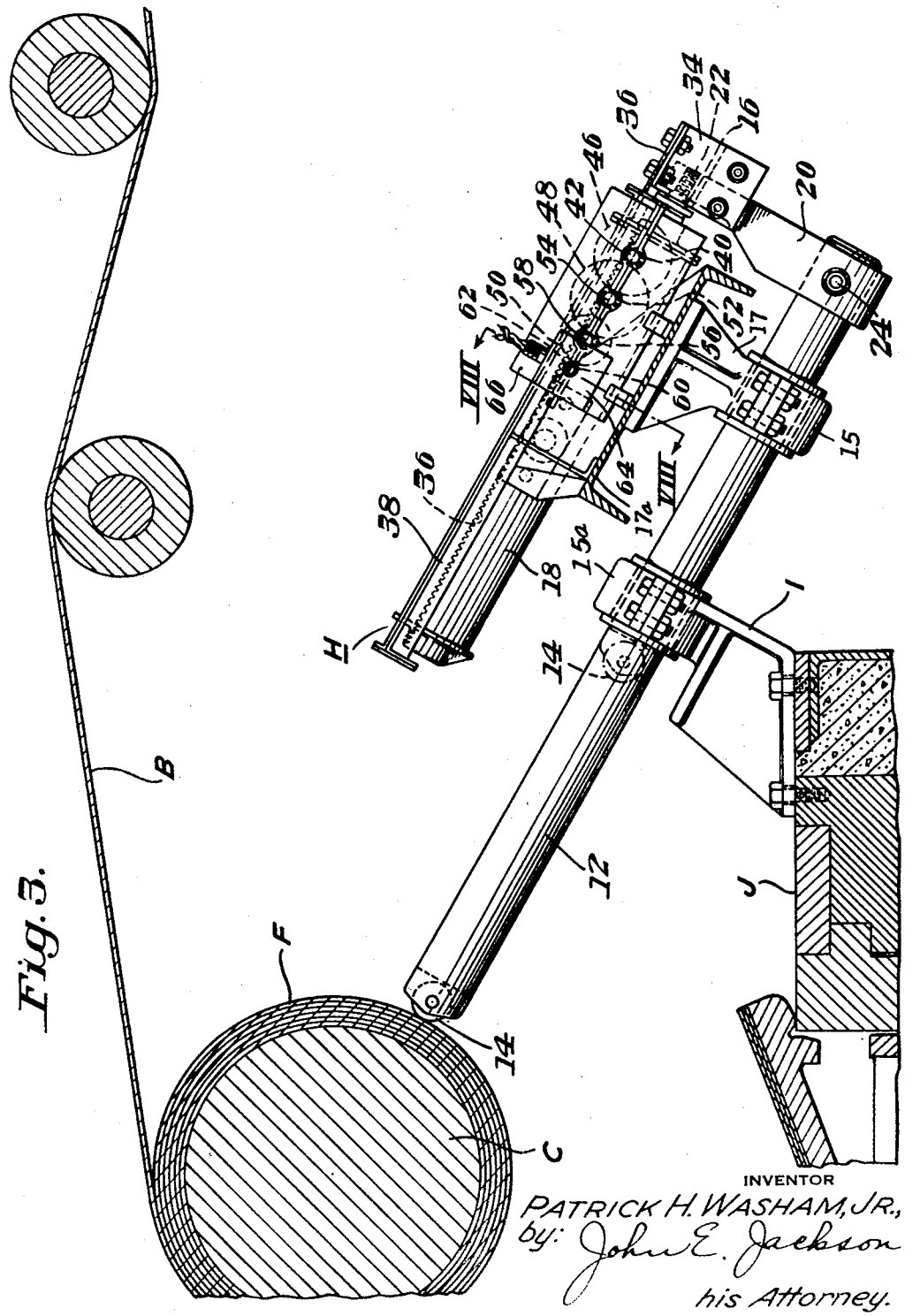
Figure 3 is an enlarged longitudinal elevation, partly in section, of the gauge-measuring instrumentalities of the present invention, showing them in operative relation to a coil being wound on the reel.
Figure 4:
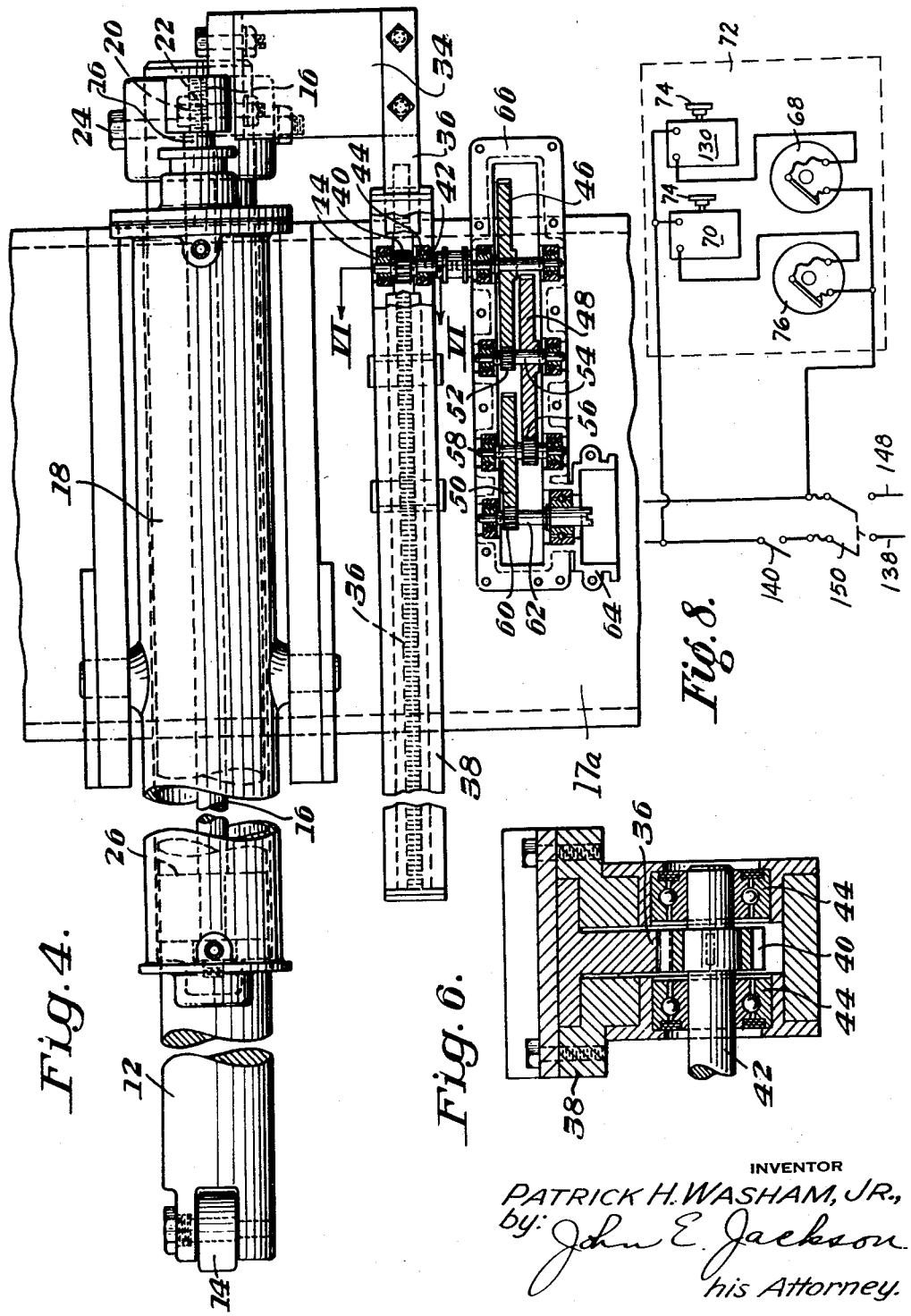
Figure 4 is a plan view, partly in section, of the instrumentalities of Figure 3, parts being broken out for purposes of illustration, the reel being omitted.
Figure 5:
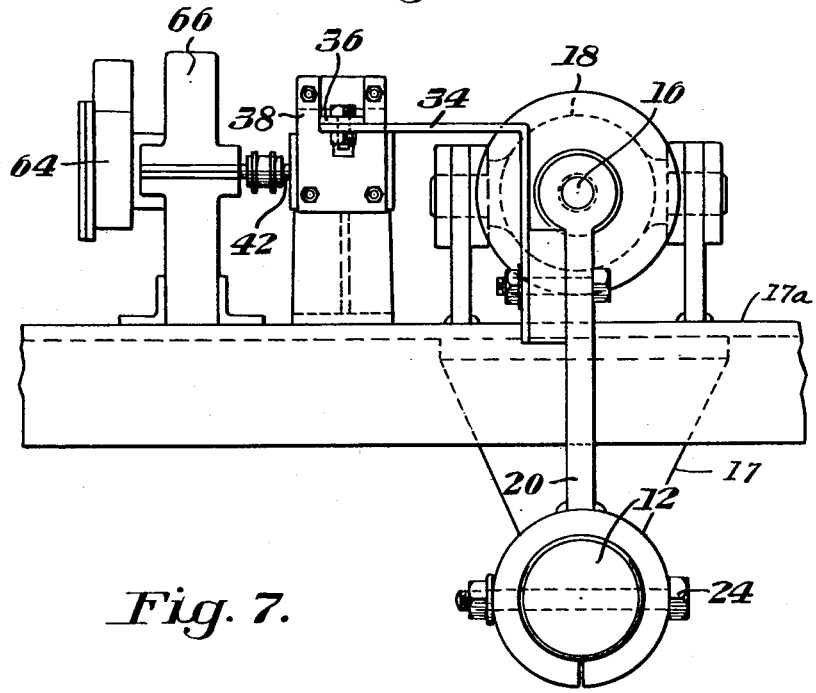
Figure 5 is a rear elevation of the mechanism as shown in Figure 4.
Figure 7:
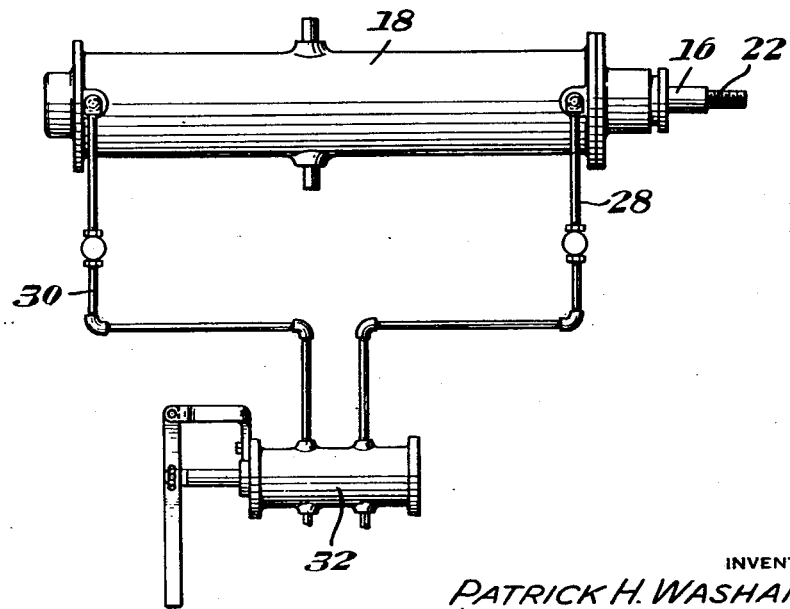
Figure 7 is a side elevation of an air control cylinder and control valve housing employed for operation of the present mechanism.

Referring more particularly to the drawings, and first to Figures 1 and 2, these views show the last stand of rolls of a strip mill indicated at A, with a strip B passing between the rolls thereof to a tension reel C, driven by shaft D. A belt wrapping mechanism indicated generally at E guides the strip onto the tension reel, on which the strip B is wound as a coil F. When the coil F is started, the belt wrapping mechanism may be retracted as shown in Figure 1 by suitable piston and toggle instrumentalities, as will be understood from Figures 1 and 2. Shaft D for driving the tension reel is power operated, as is customary.

The present invention embraces a gauging mechanism H, cooperating with the coil F, the construction of which is shown particularly in Figures 3, 4, 5 and 6. This mechanism H is secured on a bracket I mounted rigidly on a platform J by suitable fastening means, such as cap screws, shown in Figure 3.

The gauging mechanism of the present invention comprises a gauge rod 12 having at its forward end a roller 14 which engages the coil F and retracts the gauge rod 12 as the coil F builds up. For this purpose the gauge rod 12 is mounted slidably in bearing 15a, which is a part of bracket I, and also in bearing 15 that is part of a mounting bracket 17. Bracket 17 is secured to the bottom of a fixed cross beam 17a extending between the housings of stand A.

The gauge rod 12 is connected to a piston rod 16 of an air cylinder 18 through a yoke 20. The yoke is suitably secured to the piston rod of the cylinder as by means of threads 22 and bolted to the gauge rod 12 by a bolt 24. The piston rod 16 carries a piston head 26, the air cylinder being connected by pipes 28, 30 to a control valve located in housing 32. The control valve in the housing 32 is a conventional type of two-way valve.

The piston rod 16 of the air cylinder 18 also is connected by a yoke 34 to a reciprocable rack bar 36 positioned in a housing 38. The teeth of the rack bar 36 engage a pinion 40 on shaft 42 which rotates in bearings 44 in the rack bar housing 38. The shaft 42 is the actuating means for a series of gears and pinions for converting longitudinal movement of the rack bar into rotary movement of a final shaft.

The gears of the gear train are indicated at 46, 48 and 50. Gear 46 meshes with a pinion 52 on shaft 54, this shaft carrying the gear 48. Gear 48 meshes with pinion 56 on shaft 58, this shaft carrying the gear 50 which meshes with pinion 60 on final shaft 62. This shaft 62 carries a rotary counter-actuating switch shown in Figure 8, which counter-actuating switch is enclosed in housing 64. The gear and pinion train above described are enclosed in a gear box 66.

This counter-actuating switch is indicated at 68 on Figure 11, which shows the wiring diagram of the apparatus, and which will be referred to in greater detail hereinafter. Suffice to point out at this time that the counter-actuating switch 68 operates a counting device 130 on panel 72. The counting device 130 is any well-known type of counting mechanism of which there are many different makes available on the market. The counter 130 reads to four places and may be reset manually through a knob 74 in a well-known manner.

Counter-actuating switch 68 and counter mechanism 130 indicate the amount of build-up of the coil F on the tension reel C, as determined by backward movement of the gauge rod 12 and rack bar 36 responsive to build-up of the coil. The gauge rod is normally urged against the coil by cylinder 18 but may be retracted thereby to an out-of-the-way position. The rod may thus be caused to engage the coil during any selected portion of its build-up.

The drive-shaft D for the tension reels also drive a counter-actuating switch, indicated at 76. The shaft D carries a spindle 78 on which a pinion 80 is mounted, rotation of this pinion being communicated to gear 82 which is mounted on shaft 84 of the counter-actuating switch. This counter-actuating switch 76 operates a counting device 70 that is similar to counter 130, and has a function that will become clear hereinafter.

As shown in Figure 8, counter-actuating switches 76 and 68 are connected in series with counters 70 and 130, respectively, across mains 138 and 148 which can be connected to a supply line by a line switch 150. A control switch 140 permits operation of both counters to be started and stopped as desired. When switch 140 is closed, each closure of either counter-actuating switch obviously causes its counter to advance one notch or indicating unit.

The design of the rack and pinion 36, 40 and the gear train driven thereby determines the number of revolutions of shaft 62 per inch of movement of rod 12. The magnitude of any movement of the rod is thus indicated in predetermined fractions of an inch by counter 130 controlled by switch 68. Counter 70 controlled by switch 76 indicates the number of wraps laid on the coil in any given period of observation. The quotient of the rod movement by the number of wraps gives the average thickness of the strip.

It will be understood that each time a spring-pressed contact arm of either counter-actuating switch is actuated by cam element 87 at each revolution of the shaft 62 or 84, the counting mechanism 130 or 70 counts one additional unit. Since rod 12 is retractable by piston 16 in air cylinder 18, the follower wheel 14 may be applied to the coil being wrapped at any selected portion of its build-up and for a predetermined number of revolutions of shaft D as indicated by counter 70, during which period of application the counter 130 operates to indicate the radial build-up of the coil, and this indication may be converted into the gauge of the strip being coiled, which gauge is in a fraction of an inch (linear measure).

This value may also be arrived at in the following manner, which is conveniently carried out when the follower wheel 14 is applied only intermittently, at predetermined time intervals, to the coil being formed on the reel. Knowing the total gear ratio of the gear and pinion train, and the effective diameter (pitch diameter) of the rack pinion 40, the amount of travel in inches of the rack bar 36 corresponding to one revolution of the shaft 62 can be determined. This gives a multiplying factor for the reading of counter 130 to give the amount of radial coil build-up in the length of time during which the follower wheel 14 is applied to the coil.

Thus, for example, if pinions 52, 56, and 60 of the gear train have in each instance nineteen teeth, and there is a 10 to 1 ratio between the pinions and gears 46 and 48, the gears 46 and 48 will have in each instance 190 teeth. Gear 50 is somewhat smaller, say for example, with 126 teeth. The total gear ratio of the train therefore would be $$\frac{190}{19} \times \frac{190}{19} \times \frac{126}{19}$$

which equals 662.

Now, if the effective diameter of the rack pinion is, for instance, 1.054 inches the effective circumference of the rack pinion 44 will be 3,312 inches, and for each revolution of the pinion 44, the rack bar will move, responsively to the radial build-up of the coil, a corresponding distance, i. e. 3.312 inches. But while the rack bar has moved back through these 3.312 inches due to radial build-up of the coil, shaft 62 has rotated 662 times. Therefore, for each rotation of shaft 62 (i. e. for each time counter 130 has been actuated to count one additional unit) the rack bar has moved back 0.005 inch (3.312 inches divded by 662=0.005).

Therefore, the total radial build-up of the coil during any period of time will be the reading of counter 130 multiplied by 0.005; and this value divided by the total revolutions of the reel shaft D during that period of time, as indicated by counter 70, will give the average thickness of each convolution, or wrap, of the coil.

It will be apparent from the foregoing that the present invention provides a means and procedure for determining average thickness of the strip through any desired portions of the length thereof as it is wound on the reel, there being a continuous measurement of the thickness of the strip through the entire portions of the strip measured, so that any variations in thickness from the given tolerances can be detected in time to make any necessary changes in the adjustments of the several stands of the continuous mill for the correction of any such off-gage values. The radial build-up of the coil and the number of wraps in such radial build-up are determined simultaneously and recorded, and from the ratio of one to the other the average thickness of the strip is determined as explained above.

The pressure of air in the air cylinder against piston rod 16 holds the rod 12 and wheel 14 against the coil being built up on the reel under constant pressure, thereby eliminating any errors in reading that might occur through vibration of the strip or winding mechanism.

I claim:

1. Apparatus for determining the average thickness of strip while being coiled on a reel comprising a retractable gauge member adapted to engage the coil and be actuated by the build-up thereof, a periodic switch actuated in accordance with rotation of said reel, a second periodic switch actuated in accordance with movement of said gauge member, two electro-magnetic counters controlled one by each of said switches, and common control means for simultaneously rendering both counters operative under the control of their switches, respectively, thereby affording a measure of the amount of build-up of the coil resulting from an indicated number of wraps laid thereon.

2. The apparatus defined by claim 1 characterized by said first switch being of the rotating type.

3. The apparatus defined by claim 1 characterized by said second switch being of the rotating type.

4. The apparatus defined by claim 1 characterized by means mounting said gauge member for linear movement, said second switch being of the rotary type and means actuated by linear movement of the gauge member for driving said second switch.

5. The apparatus defined by claim 1 characterized by said gauge member being a reciprocable rod, and a fixed bearing supporting said rod for engagement with the periphery of the coil on the reel.

6. The apparatus defined by claim 5 characterized by a fluid-pressure cylinder and piston connected to said rod.

7. In an apparatus for determining the average thickness of strip being coiled on a reel, a gauge rod adapted to engage a coil on the reel with its forward end, fixed bearings in which said rod is slidable, a fluid-pressure cylinder and piston fixedly mounted adjacent said rod and connected thereto to actuate it, a periodic switch actuated in accordance with movement of said rod, and a counter controlled by said switch.

PATRICK H. WASHAM, JR.

REFERENCES CITED

The following references are of record in the file of this patent:

UNITED STATES PATENTS

| Number | Name | Date |
| --- | --- | --- |
| 842,044 | Wells et al. | Jan. 22, 1907 |
| 1,334,999 | Haley | Mar. 30, 1920 |
| 2,224,728 | Gulliksen | Dec. 10, 1940 |
| 2,315,747 | Terry | Apr. 6, 1943 |
| 2,356,660 | Deuel, Jr., et al. | Aug. 22, 1944 |